US012039861B2

(12) United States Patent
Guo et al.

(10) Patent No.: US 12,039,861 B2
(45) Date of Patent: Jul. 16, 2024

(54) SYSTEMS AND METHODS FOR ANALYZING THE IN-LANE DRIVING BEHAVIOR OF A ROAD AGENT EXTERNAL TO A VEHICLE

(71) Applicant: Toyota Motor Engineering & Manufacturing North America, Inc., Plano, TX (US)

(72) Inventors: Rui Guo, San Jose, CA (US); Kentaro Oguchi, Mountain View, CA (US); Takamasa Higuchi, Mountain View, CA (US); Xuewei Qi, Dublin, CA (US); Seyhan Ucar, Mountain View, CA (US); Haritha Muralidharan, Santa Clara, CA (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 361 days.

(21) Appl. No.: 17/186,401

(22) Filed: Feb. 26, 2021

(65) Prior Publication Data

US 2022/0277647 A1    Sep. 1, 2022

(51) Int. Cl.
*G06T 7/00* (2017.01)
*G06N 3/08* (2023.01)
*G06T 7/269* (2017.01)
*G06T 7/55* (2017.01)
*G06T 19/00* (2011.01)
(Continued)

(52) U.S. Cl.
CPC ............. *G08G 1/0125* (2013.01); *G06N 3/08* (2013.01); *G06T 7/269* (2017.01); *G06T 7/55* (2017.01);
(Continued)

(58) Field of Classification Search
CPC ...... G08G 1/0125; G08G 1/0112; G06T 7/55; G06T 7/269; G06T 19/00;
(Continued)

(56) References Cited

U.S. PATENT DOCUMENTS 7,113,867 B1    9/2006  Stein
10,705,525 B2   7/2020  Smolyanskiy et al.
(Continued)

FOREIGN PATENT DOCUMENTS

CN    107578436 B    1/2018
WO    2020174279 A2    9/2020

OTHER PUBLICATIONS

Chuan-en Lin, "Introduction to Motion Estimation with Optical Flow," 2019, Nanonets, whole document. (Year: 2019).*
(Continued)

*Primary Examiner* — Tiffany P Ohman
(74) *Attorney, Agent, or Firm* — Christopher G. Darrow; Darrow Mustafa PC (57) ABSTRACT

One embodiment of a system for analyzing the in-lane driving behavior of an external road agent generates a sequence of sparse 3D point clouds based on a sequence of depth maps corresponding to a sequence of images of a scene. The system performs flow clustering based on the sequence of depth maps and a sequence of flow maps to identify points across the sequence of sparse 3D point clouds that belong to a detected road agent. The system generates a dense 3D point cloud by combining at least some of those identified points. The system detects one or more lane markings and projects them into the dense 3D point cloud to generate an annotated 3D point cloud. The system analyzes the in-lane driving behavior of the detected road agent based, at least in part, on the annotated 3D point cloud.

16 Claims, 7 Drawing Sheets

(51) Int. Cl.
G06V 20/56 (2022.01)
G08G 1/01 (2006.01)

(52) U.S. Cl.
CPC ............ G06T 19/00 (2013.01); G06V 20/588 (2022.01); G08G 1/0112 (2013.01); *G06T 2207/10028* (2013.01); *G06T 2207/20084* (2013.01); *G06T 2207/30241* (2013.01); *G06T 2207/30256* (2013.01); *G06T 2219/004* (2013.01)

(58) Field of Classification Search
CPC . G06T 2207/10028; G06T 2207/20084; G06T 2207/30241; G06T 2207/30256; G06T 2219/004; G06V 20/588; G06N 3/08
USPC ......................................................... 701/117
See application file for complete search history.

(56) References Cited

U.S. PATENT DOCUMENTS

| | | | |
|---|---|---|---|
| 10,762,650 | B1 | 9/2020 | Guo et al. |
| 2008/0137989 | A1 | 6/2008 | Ng et al. |
| 2019/0004533 | A1* | 1/2019 | Huang ................. G06V 10/751 |
| 2020/0074674 | A1 | 3/2020 | Guo et al. |
| 2021/0312225 | A1* | 10/2021 | Ku ......................... G06N 3/044 |
| 2022/0044024 | A1* | 2/2022 | Sambo ................... G06T 17/00 |
| 2022/0107391 | A1* | 4/2022 | Ren .......................... G06T 7/11 |

OTHER PUBLICATIONS

Shen et al., "Joint Vehicle Detection and Distance Prediction via Monocular Depth Estimation," IET Intelligent Transport Systems, May 6, 2020, found at https://ietresearch.onlinelibrary.wiley.com/doi/pdf/10.1049/iet-its.2019.0376.

Yin et al., "GeoNet: Unsupervised Learning of Dense Depth, Optical Flow and Camera Pose," IEEE Open Access, 2018, available at https://openaccess.thecvf.com/content_cvpr_2018/papers/Yin_GeoNet_Unsupervised_Learning_CVPR_2018_paper.pdf.

You et al., "Pseudo-LiDAR++: Accurate Depth for 3D Object Detection in Autonomous Driving," arXiv:1906.06310v3, Feb. 15, 2020, available at https://arxiv.org/pdf/1906.06310.pdf.

\* cited by examiner

SYSTEMS AND METHODS FOR ANALYZING THE IN-LANE DRIVING BEHAVIOR OF A ROAD AGENT EXTERNAL TO A VEHICLE

TECHNICAL FIELD

The subject matter described herein generally relates to vehicles and, more particularly, to systems and methods for analyzing the in-lane driving behavior of a road agent external to a vehicle.

BACKGROUND

In a variety of vehicular applications such as autonomous vehicles and Advanced Driver-Assistance Systems, a vehicle analyzes the in-lane driving behavior (the trajectory traversed within a lane, including, in some applications, at a micro level) of an external road agent such as another vehicle. In some designs, the vehicle analyzes fused sensor data from, for example, image sensors and Light Detection and Ranging (LIDAR) sensors. Such an approach imposes high processing demands on the vehicle's onboard computing system, and LIDAR sensors increase the cost and complexity of the vehicle.

SUMMARY

An example of a system for analyzing in-lane driving behavior of a road agent external to a vehicle is presented herein. The system comprises one or more processors and a memory communicably coupled to the one or more processors. The memory stores a three-dimensional (3D) rendering module including instructions that when executed by the one or more processors cause the one or more processors to generate a sequence of sparse 3D point clouds based on a sequence of depth maps corresponding to a sequence of images of a scene external to the vehicle. The 3D rendering module also includes instructions that when executed by the one or more processors cause the one or more processors to perform flow clustering based on the sequence of depth maps and a sequence of flow maps corresponding to the sequence of images to identify points across the sequence of sparse 3D point clouds that belong to a detected road agent in the scene. The 3D rendering module also includes instructions that when executed by the one or more processors cause the one or more processors to generate a dense 3D point cloud that includes the detected road agent by combining at least some of the points across the sequence of sparse 3D point clouds that belong to the detected road agent. The memory also stores a lane markings module including instructions that when executed by the one or more processors cause the one or more processors to detect one or more lane markings in the scene and project the one or more lane markings into the dense 3D point cloud to generate an annotated 3D point cloud. The memory also stores an analysis module including instructions that when executed by the one or more processors cause the one or more processors to analyze the in-lane driving behavior of the detected road agent based, at least in part, on the annotated 3D point cloud.

Another embodiment is a non-transitory computer-readable medium for analyzing in-lane driving behavior of a road agent external to a vehicle and storing instructions that when executed by one or more processors cause the one or more processors to generate a sequence of sparse three-dimensional (3D) point clouds based on a sequence of depth maps corresponding to a sequence of images of a scene external to the vehicle. The instructions also cause the one or more processors to perform flow clustering based on the sequence of depth maps and a sequence of flow maps corresponding to the sequence of images to identify points across the sequence of sparse 3D point clouds that belong to a detected road agent in the scene. The instructions also cause the one or more processors to generate a dense 3D point cloud that includes the detected road agent by combining at least some of the points across the sequence of sparse 3D point clouds that belong to the detected road agent. The instructions also cause the one or more processors to detect one or more lane markings in the scene and project the one or more lane markings into the dense 3D point cloud to generate an annotated 3D point cloud. The instructions also cause the one or more processors to analyze the in-lane driving behavior of the detected road agent based, at least in part, on the annotated 3D point cloud.

In another embodiment, a method of analyzing in-lane driving behavior of a road agent external to a vehicle is disclosed. The method comprises generating a sequence of sparse three-dimensional (3D) point clouds based on a sequence of depth maps corresponding to a sequence of images of a scene external to the vehicle. The method also includes performing flow clustering based on the sequence of depth maps and a sequence of flow maps corresponding to the sequence of images to identify points across the sequence of sparse 3D point clouds that belong to a detected road agent in the scene. The method also includes generating a dense 3D point cloud that includes the detected road agent by combining at least some of the points across the sequence of sparse 3D point clouds that belong to the detected road agent. The method also includes detecting one or more lane markings in the scene and projecting the one or more lane markings into the dense 3D point cloud to generate an annotated 3D point cloud. The method also includes analyzing the in-lane driving behavior of the detected road agent based, at least in part, on the annotated 3D point cloud.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Various embodiments disclosed herein overcome the cost and processing-overhead disadvantages of multi-modal-sensor-based systems for analyzing the in-lane driving behavior of a road agent external to a vehicle by employing sequential monocular depth estimation (MDE) and other processing techniques that are described in detail below. In this description, a "road agent external to a vehicle" or "external road agent" refers, without limitation, to another vehicle (e.g., an automobile, truck, etc.), a motorcycle, or a bicycle. In the applications to which the embodiments disclosed herein pertain, the external road agent is in the vicinity of an ego vehicle. For example, the external road agent might be a vehicle traveling ahead of the ego vehicle in the same lane without any intervening road agents (a "preceding vehicle"), or the external road agent might be in an adjacent lane near the ego vehicle (ahead of, beside, or behind the ego vehicle). In general, the external road agent is within the range of a camera that is installed on the ego vehicle. Such a camera can be aimed forward, to the side, or to the rear of the ego vehicle, depending on the particular embodiment. In some embodiments, the ego vehicle is equipped with more than one camera to cover different regions surrounding the ego vehicle simultaneously.

In various embodiments, an in-lane driving behavior analysis system installed in the ego vehicle performs sequential MDE (sometimes also referred to by those skilled in the art as "sMDE") on a sequence of images of a scene captured by a camera. In some embodiments, the sequence of images is processed by a deep neural network (DNN) that performs sequential MDE. This process produces a sequence of depth maps corresponding to the sequence of images. In some embodiments, each depth map in the sequence of depth maps is a grayscale image whose pixel intensities correspond to the distance from the camera of the respective pixels in the image. Another DNN, a "FlowNet," also processes the sequence of images to perform an optical flow operation, which produces a sequence of flow maps corresponding to the sequence of images. In some embodiments, each flow map in the sequence of flow maps represents the speed of detected objects in the scene (e.g., detected external road agents) as pixel intensities and the direction in which the detected objects are moving as pixel colors.

Based on the sequence of depth maps, the in-lane driving behavior analysis system can generate a sequence of sparse 3D point clouds. Such 3D point clouds are referred to as "sparse" because each 3D point cloud in the sequence is generated using the depth information from a single image in the sequence of images, and the resulting points in 3D space are not necessarily closely spaced. In some embodiments, the in-lane driving behavior analysis system performs a flow clustering operation based on the sequence of depth maps and the sequence of flow maps to identify points across the sequence of sparse 3D point clouds that belong to a detected road agent in the scene. By combining at least some of those points that belong to the detected road agent across the sequence of sparse 3D point clouds, the in-lane driving behavior analysis system can generate a dense 3D point cloud that includes the detected road agent. Such a point cloud is referred to as "dense" because the pixels associated with the detected road agent are more closely spaced than in a sparse 3D point cloud, resulting in a 3D point cloud of higher resolution that better supports an analysis of the in-lane driving behavior of the detected road agent.

In some embodiments, the in-lane driving behavior analysis system also processes the sequence of images using another DNN to detect one or more lane markings in the scene and projects the one or more detected lane markings into the dense 3D point cloud to generate an annotated 3D point cloud (this annotated 3D point cloud is the dense 3D point cloud referred to above with the projected lane markings added). The in-lane driving behavior analysis system can then analyze the in-lane driving behavior (in some embodiments, at a micro level) of the detected road agent based, at least in part, on the annotated 3D point cloud. One application for the various embodiments of an in-lane driving behavior analysis system described herein is detecting anomalous driving behavior (e.g., substance-impaired driving such as drunk driving) by the detected road agent. Other applications include, without limitation, collision/obstacle avoidance and intelligent driver-assistance systems.

The various in-lane driving behavior analysis systems and methods described herein can be applied to fully autonomous vehicles, semi-autonomous vehicles, vehicles equipped with an Advanced Driver-Assistance System (ADAS), and vehicles driven manually by a human driver.

Figure 1:
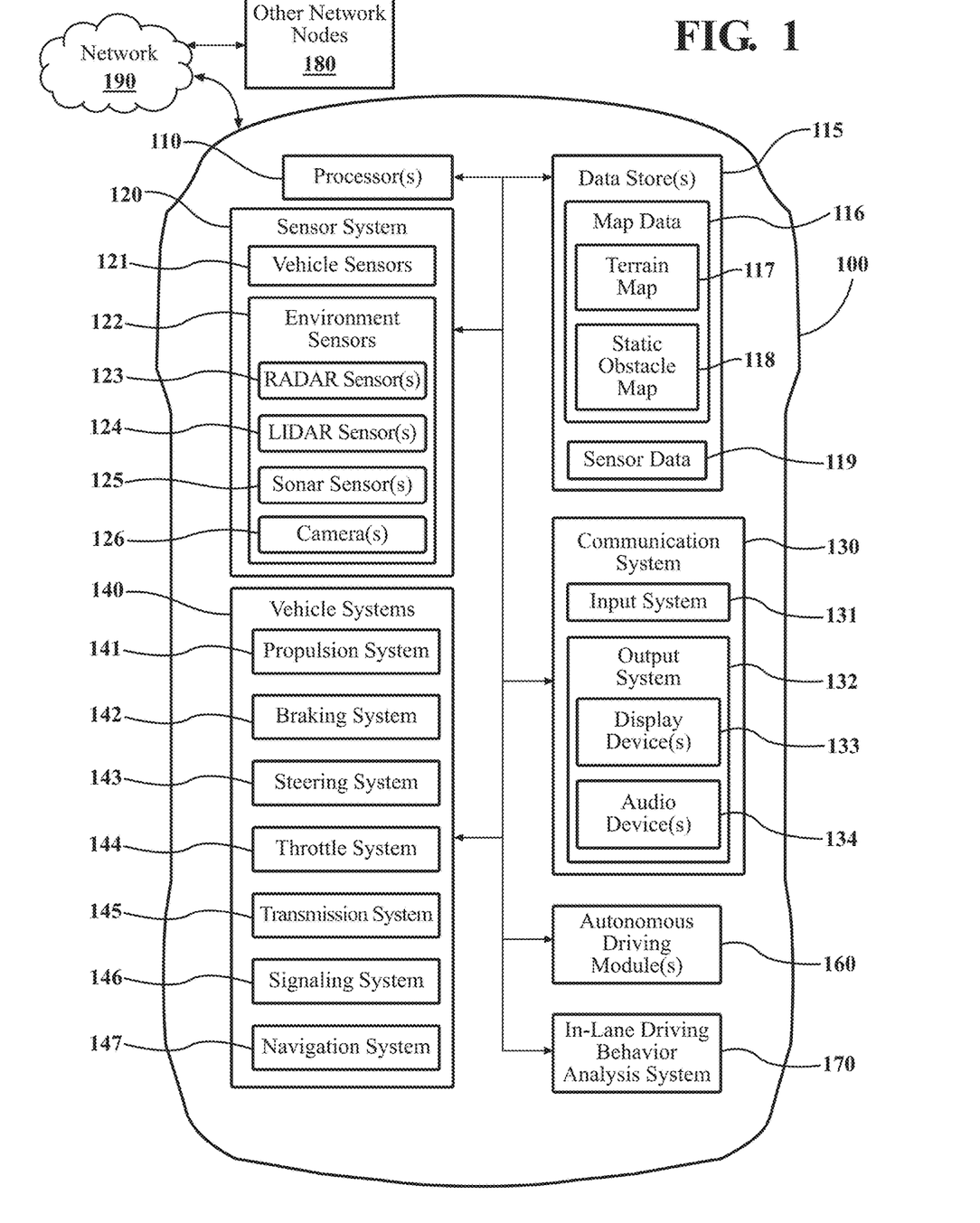
FIG. 1 illustrates one embodiment of a vehicle within which systems and methods disclosed herein may be implemented.

Referring to FIG. 1, an example of a vehicle 100, in which systems and methods disclosed herein can be implemented, is illustrated. A vehicle 100 is sometimes referred to herein as an "ego vehicle" (a vehicle from whose point of view the in-lane driving behavior of road agents external to that vehicle is analyzed using the systems and methods described herein). As used herein, a "vehicle" is any form of motorized transport. One example of a "vehicle," without limitation, is an automobile. In some embodiments, vehicle 100 can operate, at least some of the time, in a fully autonomous mode (e.g., what the automotive industry refers to as autonomy Levels 3-5, particularly Level 5). In other embodiments, vehicle 100 can operate in a semi-autonomous mode (e.g., via an adaptive cruise-control system, an automatic lane-change assistance system, or an automatic parking system). In other embodiments, vehicle 100 includes an intelligent driving assistance system such as an Advanced Driver-Assistance System (ADAS). In still other embodiments, vehicle 100 may be driven manually by a human driver. The vehicle 100 can include an in-lane driving behavior analysis system 170 or capabilities to support or interact with the in-lane driving behavior analysis system 170 and thus benefits from the functionality discussed herein. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including in-lane driving behavior analysis system 170.

While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 can communicate with other network nodes 180 (e.g., connected vehicles, cloud servers, edge servers, roadside units, infrastructure) via a network 190. In some embodiments, network 190 includes the Internet.

Some of the possible elements of the vehicle 100 are shown in FIG. 1 and will be described in connection with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. Sensor system 120 can also include one or more environment sensors 122. Environment sensors 122 generally include, without limitation, radar sensor(s) 123, Light Detection and Ranging (LIDAR) sensor(s) 124, sonar sensor(s) 125, and camera(s) 126. One or more of these various types of environment sensors 122 can be used to detect objects (e.g., external road agents) and, in other respects, understand the environment surrounding vehicle 100. This process is sometimes referred to as "scene understanding."

Of particular relevance to the embodiments discussed herein are configurations of vehicle 100 in which the primary environment sensors 122 are one or more cameras 126. The images produced by a given camera 126 can be used to perform monocular depth estimation, an alternative approach to LIDAR for measuring the distance/range to objects in the scene. In embodiments in which vehicle 100 is capable of semi-autonomous or fully autonomous operation, vehicle 100 includes autonomous driving module(s) 160 to control autonomous or semi-autonomous operation.

Figure 2:
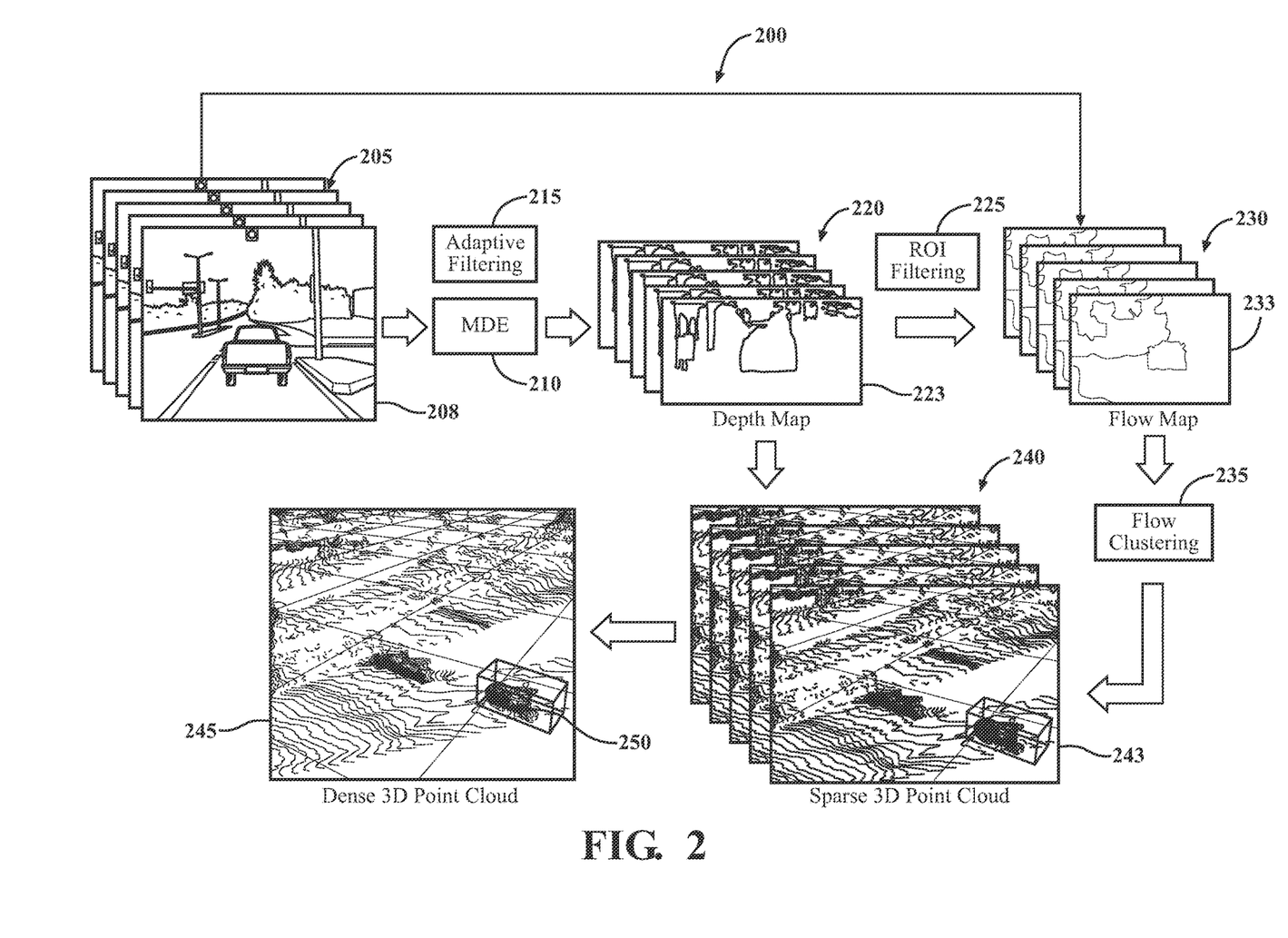
FIG. 2 is a process flow to generate a dense three-dimensional (3D) point cloud, in accordance with an illustrative embodiment of the invention.

FIG. 2 is a process flow 200 to generate a dense 3D point cloud, in accordance with an illustrative embodiment of the invention. In the embodiment of FIG. 2, a sequence of images 205 (a plurality of successive images 208 captured by a camera 126) is input to a MDE operation 210. In some embodiments, the image frames (the individual images 208) are captured at 10 frames/s. In other embodiments, the images 208 in the sequence of images 205 are captured at a faster frame rate (e.g., 30 frames/s). ROI filtering 225 can be applied to the sequence of images 205 to crop the images 208 so they include the region(s) of interest (e.g., the roadway rather than the sky), and adaptive filtering 215 can be applied to the sequence of images 205 to identify objects (e.g., external road agents) in the scene. Adaptive filtering 215 can include techniques such as semantic segmentation and instance segmentation. One advantage of applying ROI filtering 225 is that it reduces the number of pixels that need to be processed, increasing efficiency. Additionally, in some embodiments, objects such as stationary objects (e.g., lampposts, parked vehicles), people in wheelchairs, bicyclists, pedestrians, etc., can be selectively removed from the analysis to reduce processing overhead.

The MDE operation 210 can be implemented in a variety of ways, depending on the embodiment. In one embodiment, the MDE operation 210 is performed by a DNN that has been trained in a supervised manner beforehand to estimate the depth associated with the respective pixels in a monocular image. Using sequential MDE (i.e., applying MDE to the sequence of images 205), MDE operation 210 produces a sequence of depth maps 220. Each depth map 223 in the sequence of depth maps 220 corresponds to an image 208 in the sequence of images 205. For example, the first depth map 223 in the sequence of depth maps 220 corresponds to the first image 208 in the sequence of images 205, the second depth map 223 corresponds to the second image 208, and so on. As discussed above, in some embodiments, each depth map 223 in the sequence of depth maps 220 is a grayscale image whose pixel intensities correspond to the distance from the camera 126 of the respective pixels in the corresponding image 208.

"Optical flow" refers to an analysis of the motion of a detected object in the scene from image 208 to image 208 in the sequence of images 205 (i.e., from video frame to video frame). In some embodiments, the sequence of images 205 is processed through an optical-flow operation (not shown in FIG. 2) that produces a sequence of flow maps 230 made up of individual flow maps 233. The process of generating the sequence of flow maps 230 is discussed in greater detail below in connection with FIG. 4. As with the sequence of depth maps 220, each flow map 233 in the sequence of flow maps 230 corresponds to an image 208 in the sequence of images 205. For example, the first flow map 233 in the sequence of flow maps 230 corresponds to the first image 208 in the sequence of images 205, the second flow map 233 corresponds to the second image 208, and so on. Each flow map 233 represents the speed of a detected object in the scene (e.g., a detected external road agent) as an intensity of the pixels that belong to that detected object and represents the direction in which that detected object is moving as a color of the pixels that belong to that detected object. For example, in one embodiment, red pixels represent motion to the right, and green pixels represent motion to the left.

As shown in FIG. 2, the sequence of depth maps 220 is used to generate a sequence of sparse 3D point clouds 240 made up of individual sparse 3D point clouds 243 that correspond, respectively, to the images 208 in the sequence of images 205 in a manner similar to the sequence of depth maps 220 and the sequence of flow maps 230. The sparse 3D point clouds 243 are generated by projecting the pixels of an image 208 to their corresponding coordinates in 3D space based on the depth values associated with the pixels in the depth maps 223 and the intrinsics (e.g., focal length, principal points, and distortion characteristics) and extrinsics (e.g., height above the ground and orientation) of the camera 126 that produced the sequence of images 205. The sequence of depth maps 220 and the sequence of flow maps 230 are processed through a flow clustering operation 235 to generate a dense 3D point cloud 245 from the sequence of sparse 3D point clouds 240. This dense 3D point cloud 245 supports an analysis of the in-lane driving behavior of a detected road agent 250. The flow clustering operation 235 is discussed in greater detail below in connection with FIG. 5.

Figure 3:
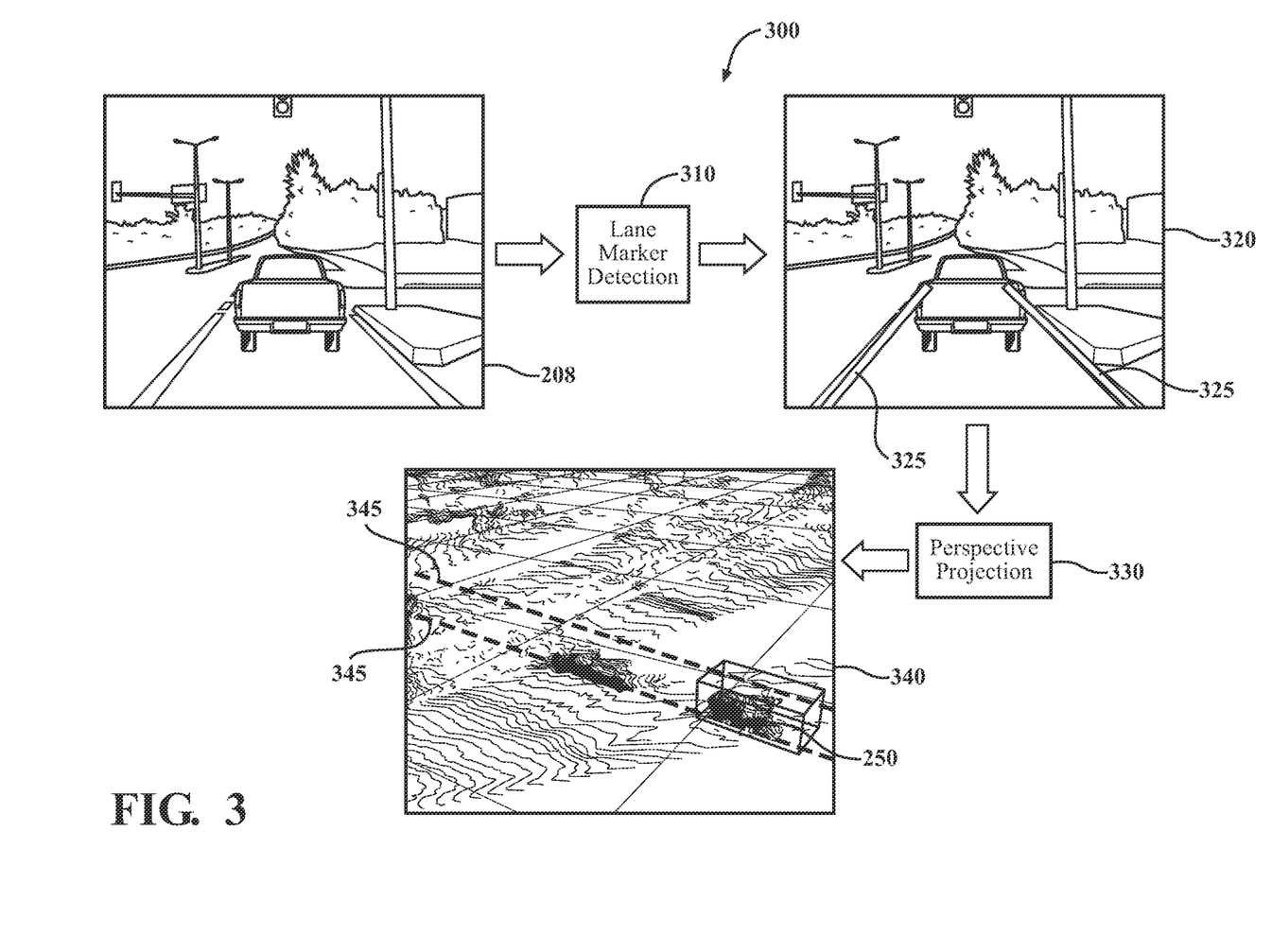
FIG. 3 is a process flow to detect lane markings and project them into a dense 3D point cloud, in accordance with an illustrative embodiment of the invention.

FIG. 3 is a process flow 300 to detect lane markings and project them into a dense 3D point cloud, in accordance with an illustrative embodiment of the invention. As shown in FIG. 3, an image 208 from the sequence of images 205 is input to a lane marker detection operation 310, which produces an annotated image 320 in which one or more lane markings 325 are marked (e.g., as yellow lines, in some embodiments). The annotated image 320 is then input to a perspective projection operation 330 that projects the detected lane markings 325 into the dense 3D point cloud 245 discussed above to produce an annotated 3D point cloud 340 (this is the dense 3D point cloud 245 discussed above with the projected lane markings added in 3D space as annotation). As shown in FIG. 3, the annotated 3D point cloud 340 includes the projected lane markings 345. The perspective-projected lane markings 345 provide a frame of reference for the analysis of the in-lane driving behavior of a detected road agent 250. This analysis is discussed further below.

In one embodiment, the lane marker detection operation 310 is implemented using a DNN that is trained beforehand in a supervised fashion. In other embodiments, other (non-machine-learning-based) algorithms (e.g., edge/line detection, filtering operations) can be used to detect lane markings 325 in images 208.

Figure 4:
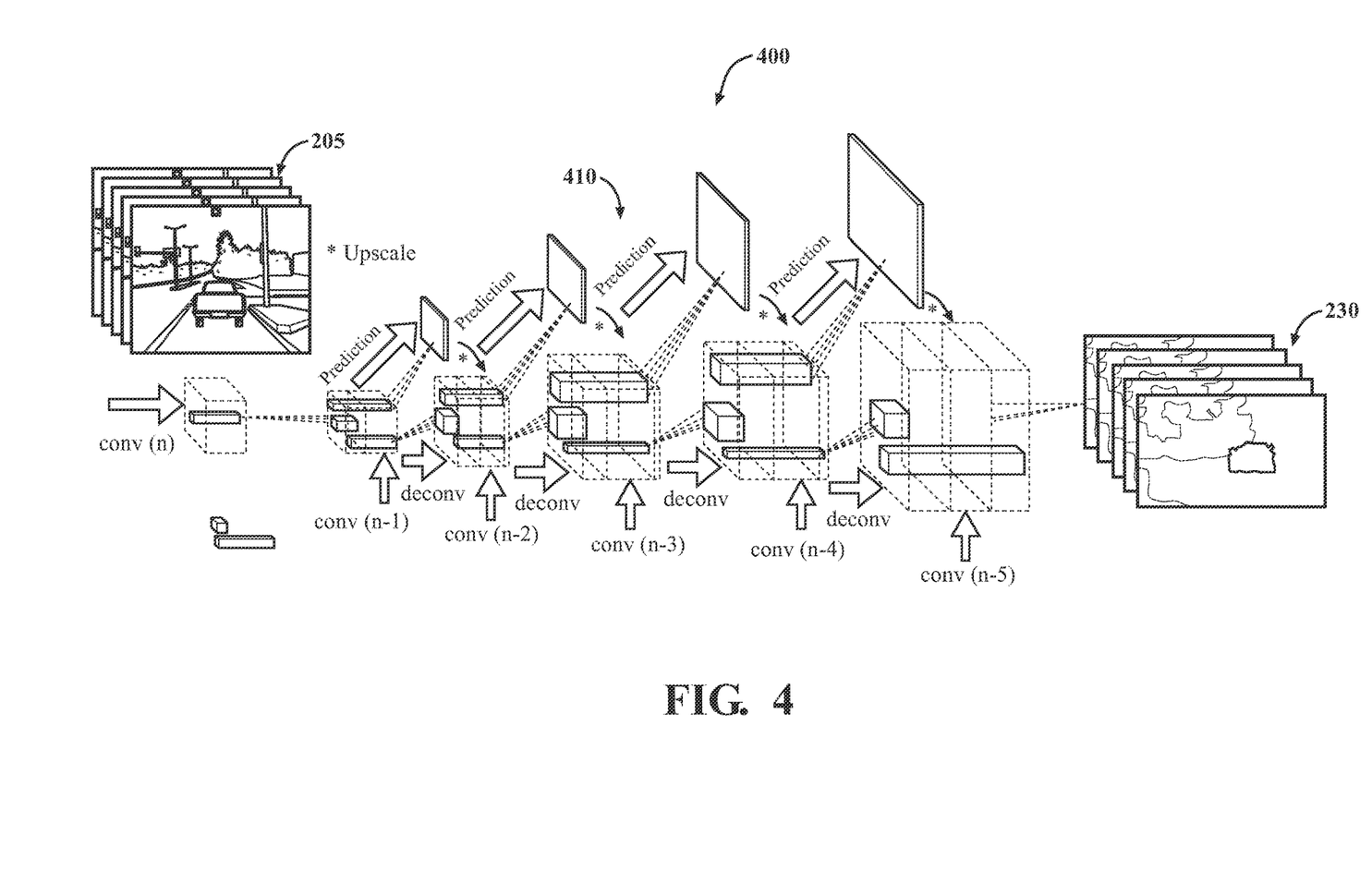
FIG. 4 is a process flow for an optical flow operation to generate a sequence of optical flow maps, in accordance with an illustrative embodiment of the invention.

FIG. 4 is a process flow 400 for an optical flow operation to generate a sequence of optical flow maps 230, in accordance with an illustrative embodiment of the invention. Refer to the sequence of flow maps 230 illustrated in FIG. 2. FIG. 4 shows in greater detail how the sequence of flow maps 230 is generated. In FIG. 4, the sequence of images 205 is input to a DNN (optical-flow deep neural network 410) that is referred to herein as "FlowNet." As indicated in FIG. 4, optical-flow deep neural network 410 includes multiple convolutional and deconvolutional stages that ultimately output the sequence of flow maps 230. Optical-flow deep neural network 410 can be trained in a supervised fashion beforehand.

Figure 5:
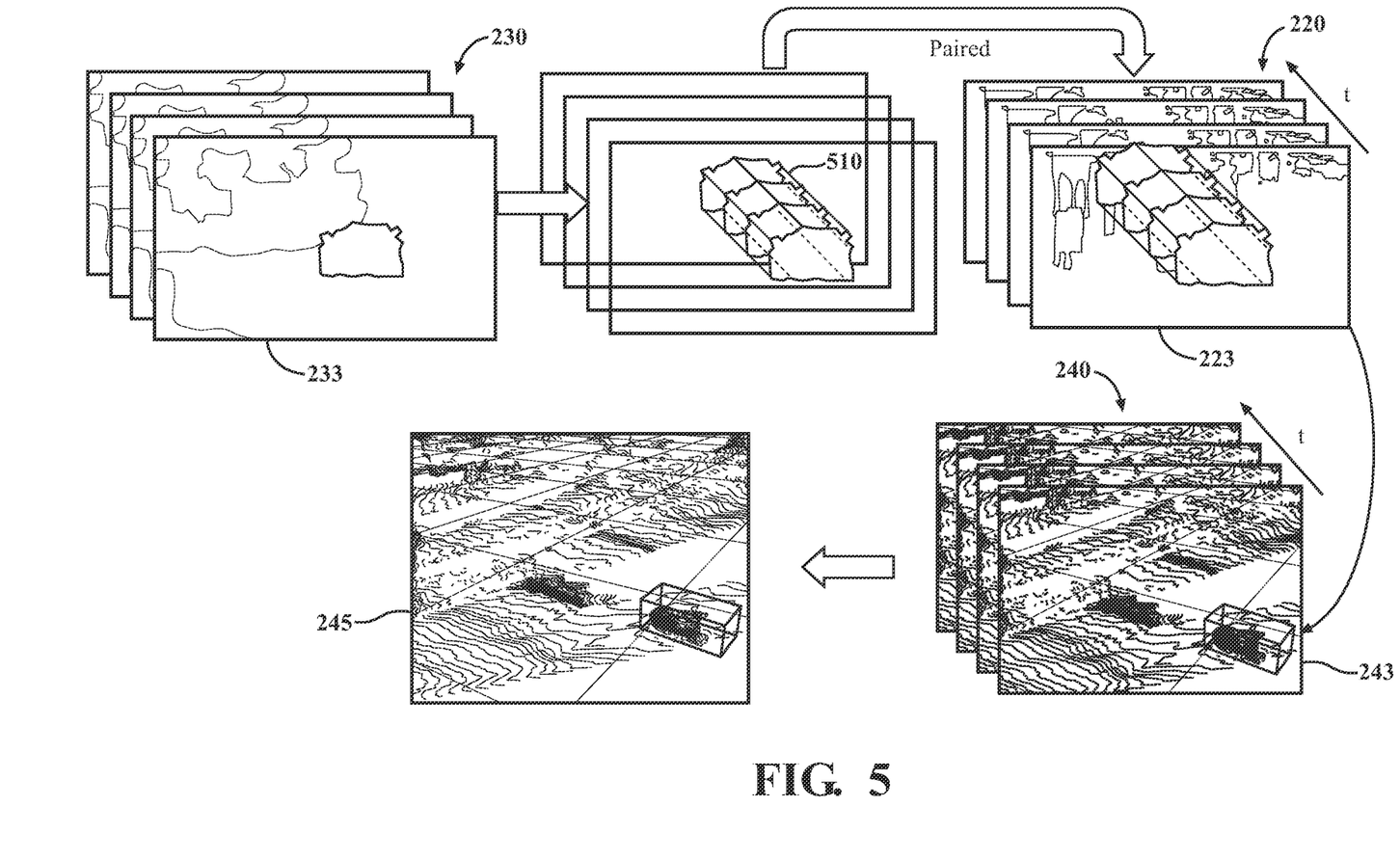
FIG. 5 is a process flow of a flow clustering operation, in accordance with an illustrative embodiment of the invention.

FIG. 5 is a process flow of a flow clustering operation 235 (refer to FIG. 2), in accordance with an illustrative embodiment of the invention. As shown in FIG. 5, the flow maps 233 in the sequence of flow maps 230 are paired with the corresponding depth maps 223 in the sequence of depth maps 220 to generate a clustering mask 510 that identifies, along the temporal axis, the pixels that belong to the same detected road agent 250 across the sequence of images 205. This information is used to identify the points across the sequence of sparse 3D point clouds 240 that belong to the detected road agent 250 in the scene. At least some of those points are combined (e.g., superimposed) to generate the dense 3D point cloud 245 that includes a higher-resolution version of the detected road agent in 3D space to support an analysis (in some embodiments, a detailed micro analysis) of the detected road agent's in-lane driving behavior. As discussed above in connection with FIG. 3, the detected lane markings 325 can be projected into the dense 3D point cloud 245 to generate the annotated 3D point cloud 340 that includes projected lane markings 345.

Figure 6:
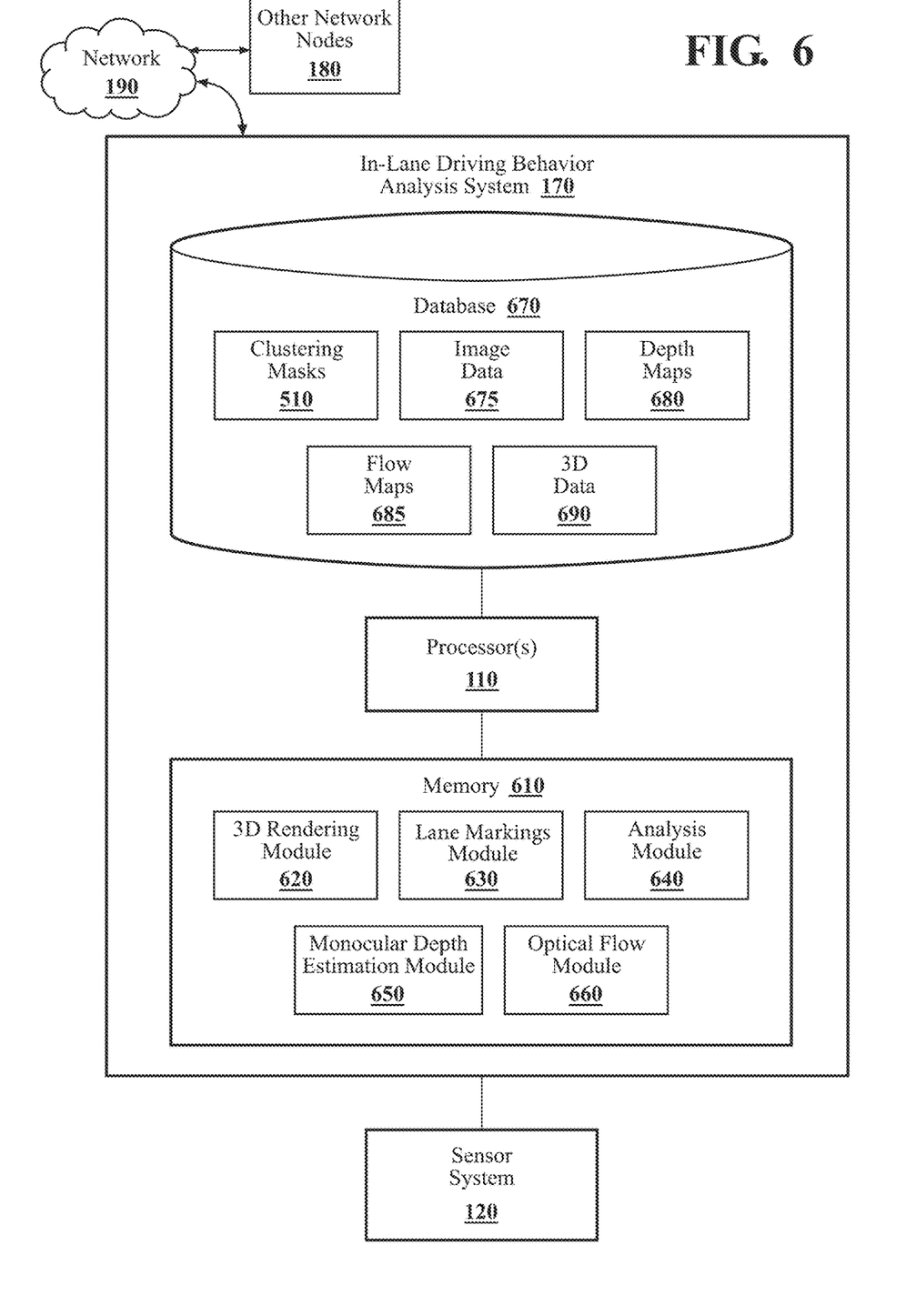
FIG. 6 is a block diagram of an in-lane driving behavior analysis system, in accordance with an illustrative embodiment of the invention.

FIG. 6 is a block diagram of an in-lane driving behavior analysis system 170, in accordance with an illustrative embodiment of the invention. As discussed above, in-lane driving behavior analysis system 170 is installed in a vehicle 100—an ego vehicle—to analyze the in-lane driving behavior of external road agents 250 in the environment (e.g., to detect anomalous driving behavior such as drunk driving by external road agents). In this embodiment, in-lane driving behavior analysis system 170 is shown as including one or more processors 110 from the vehicle 100 of FIG. 1. In general, the one or more processors 110 may be a part of in-lane driving behavior analysis system 170, in-lane driving behavior analysis system 170 may include one or more separate processors from the one or more processors 110 of the vehicle 100, or in-lane driving behavior analysis system 170 may access the one or more processors 110 through a data bus or another communication path, depending on the embodiment.

In one embodiment, memory 610 stores a 3D rendering module 620, a lane markings module 630, an analysis module 640, a monocular depth estimation module 650, and an optical flow module 660. The memory 610 is a random-access memory (RAM), read-only memory (ROM), a hard-disk drive, a flash memory, or other suitable memory for storing the modules 620, 630, 640, 650, and 660. The modules 620, 630, 640, 650, and 660 are, for example, computer-readable instructions that, when executed by the one or more processors 110, cause the one or more processors 110 to perform the various functions disclosed herein.

As shown in FIG. 6 and as discussed above, in-lane driving behavior analysis system 170 can communicate with one or more other network nodes 180 (e.g., connected vehicles, cloud servers, edge servers, roadside units, infrastructure) via network 190. In-lane driving behavior analysis system 170 can also interface and communicate with sensor system 120. In communicating with other connected vehicles, a vehicle 100 can employ Dedicated Short-Range Communications (DSRC), Wi-Fi, or mmWave technology to establish one or more vehicle-to-vehicle (V2V) communication links. In communicating with servers, a vehicle 100 can employ technologies such as cellular data. Though not shown in FIG. 6, in-lane driving behavior analysis system 170, in communicating with other network nodes 180, can do so via communication system 130 (refer to FIG. 1).

In-lane driving behavior analysis system 170 can store several different kinds of data in a database 670. Examples include image data 675, which can include one or more sequences of images 205; depth maps 680, which can include one or more sequences of flow maps 230; flow maps 685, which can include one or more sequences of depth maps 220; 3D data 690, which can include one or more sequences of sparse 3D point clouds 240, one or more dense 3D point clouds 245 and one or more annotated 3D point clouds 340; and one or more clustering masks 510 (see FIG. 5).

Monocular depth estimation module 650 generally includes instructions that when executed by the one or more processors 110 cause the one or more processors 110 to process a sequence of images 205 using a DNN that performs MDE to generate a corresponding sequence of depth maps 220, as discussed above in connection with FIG. 2. As discussed above, in some embodiments, each depth map 233 in the sequence of depth maps 220 is a grayscale image whose pixel intensities correspond to the distance from the camera 126 of the respective pixels in the corresponding image 208. As also mentioned above, the specific implementation of the MDE operation 210 discussed in connection with FIG. 2 can vary, depending on the particular embodiment.

Optical flow module 660 generally includes instructions that when executed by the one or more processors 110 cause the one or more processors 110 to process the sequence of images 205 using another DNN (refer to optical-flow deep neural network 410 in FIG. 4) that generates the sequence of flow maps 230, as discussed above in connection with FIG. 2 and FIG. 4. As discussed above, each flow map 233 represents the speed of a detected object in the scene (e.g., a detected external road agent) as an intensity of the pixels that belong to that detected object and represents the direction in which the detected object is moving as a color of the pixels that belong to that detected object.

3D rendering module 620 generally includes instructions that when executed by the one or more processors 110 cause the one or more processors 110 to generate a sequence of sparse 3D point clouds 240 based on a sequence of depth maps 220 corresponding to a sequence of images 205 of a scene external to a vehicle 100, as discussed above in connection with FIG. 2. In another aspect, 3D rendering module 620 includes instructions that when executed by the one or more processors 110 cause the one or more processors 110 to perform flow clustering (see flow clustering operation 235 in FIG. 2 and the associated process flow in FIG. 5) based on a sequence of depth maps 220 and a sequence of flow maps 230 corresponding to the sequence of images 205 to identify points across the sequence of sparse 3D point clouds 240 that belong to a detected road agent 250 in the scene. In another aspect, 3D rendering module 620 includes instructions that when executed by the one or more processors 110 cause the one or more processors 110 to generate a dense 3D point cloud 245 that includes the detected road agent 250 by combining (e.g., superimposing) at least some of the points across the sequence of sparse 3D point clouds 240 that belong to the detected road agent 250, as discussed above in connection with FIG. 5. As also discussed above in connection with FIG. 5, in some embodiments, 3D rendering module 620 includes instructions that when executed by the one or more processors 110 cause the one or more processors 110 to pair the flow maps 233 in the sequence of flow maps 230 with corresponding depth maps 223 in the sequence of depth maps 220 to generate a clustering mask 510 that identifies the points across the sequence of sparse 3D point clouds 240 that belong to the detected road agent 250 in the scene.

Lane markings module 630 generally includes instructions that when executed by the one or more processors 110 cause the one or more processors 110 to detect one or more lane markings 325 in the scene and project the one or more lane markings 325 into the dense 3D point cloud 245 to generate an annotated 3D point cloud 340, as discussed above in connection with FIG. 3. In one embodiment, lane markings module 630 detects the lane markings 325 by processing the sequence of images 205 using another DNN (distinct from the two other distinct DNNs already mentioned in connection with the MDE operation 210 and the optical flow analysis). In such an embodiment, the DNN that detects lane markings 325 can be trained in a supervised fashion beforehand. As discussed above, in other embodiments, other (non-machine-learning-based) algorithms (e.g., edge/line detection, filtering operations) can be used to detect lane markings 325 in the images 208 of sequence of images 205.

Analysis module 640 generally includes instructions that when executed by the one or more processors 110 cause the one or more processors 110 to analyze the in-lane driving behavior of the detected road agent 250 based, at least in part, on the annotated 3D point cloud 340. In this context, "in-lane driving behavior" refers to the trajectory the detected road agent 250 traverses within its lane. In some embodiments, this trajectory is analyzed at detailed or "micro" level.

In some embodiments, analysis module 640 includes instructions to detect deviations (weaving, oscillating, meandering, drifting, etc.) of the trajectory of the detected road agent 250 from a reference trajectory within the lane defined by the one or more lane markings (345) projected into the annotated 3D point cloud 340. In some embodiments, analysis module 640 includes instructions to determine that the detected deviations in the detected road agent's trajectory within the lane indicate anomalous (abnormal) driving behavior. In general, such a determination can be based on recognizing characteristic patterns in the trajectory that correspond to anomalous driving behavior. In some embodiments, this pattern analysis and recognition can be accomplished using machine-learning-based algorithms. In other embodiments, deterministic analysis algorithms (e.g., based on a figure of merit that measures cumulative deviation from the expected trajectory over a predetermined time horizon) can be applied to identify anomalous driving patterns in the detected road agent's trajectory. In some embodiments, analysis module 640 specifically identifies anomalous driving patterns associated with substance-impaired driving (e.g., drunk driving).

Depending on the embodiment, when analysis module 640 determines that the detected deviations indicate anomalous driving behavior, analysis module 640 can cause a warning to be output to a driver or occupant of vehicle 100 and/or an ADAS or other subsystem of vehicle 100 such as the autonomous driving module(s) 160 can intervene to avoid a potential collision with the detected road agent by at least temporarily controlling the steering, braking, and/or acceleration of vehicle 100.

Figure 7:
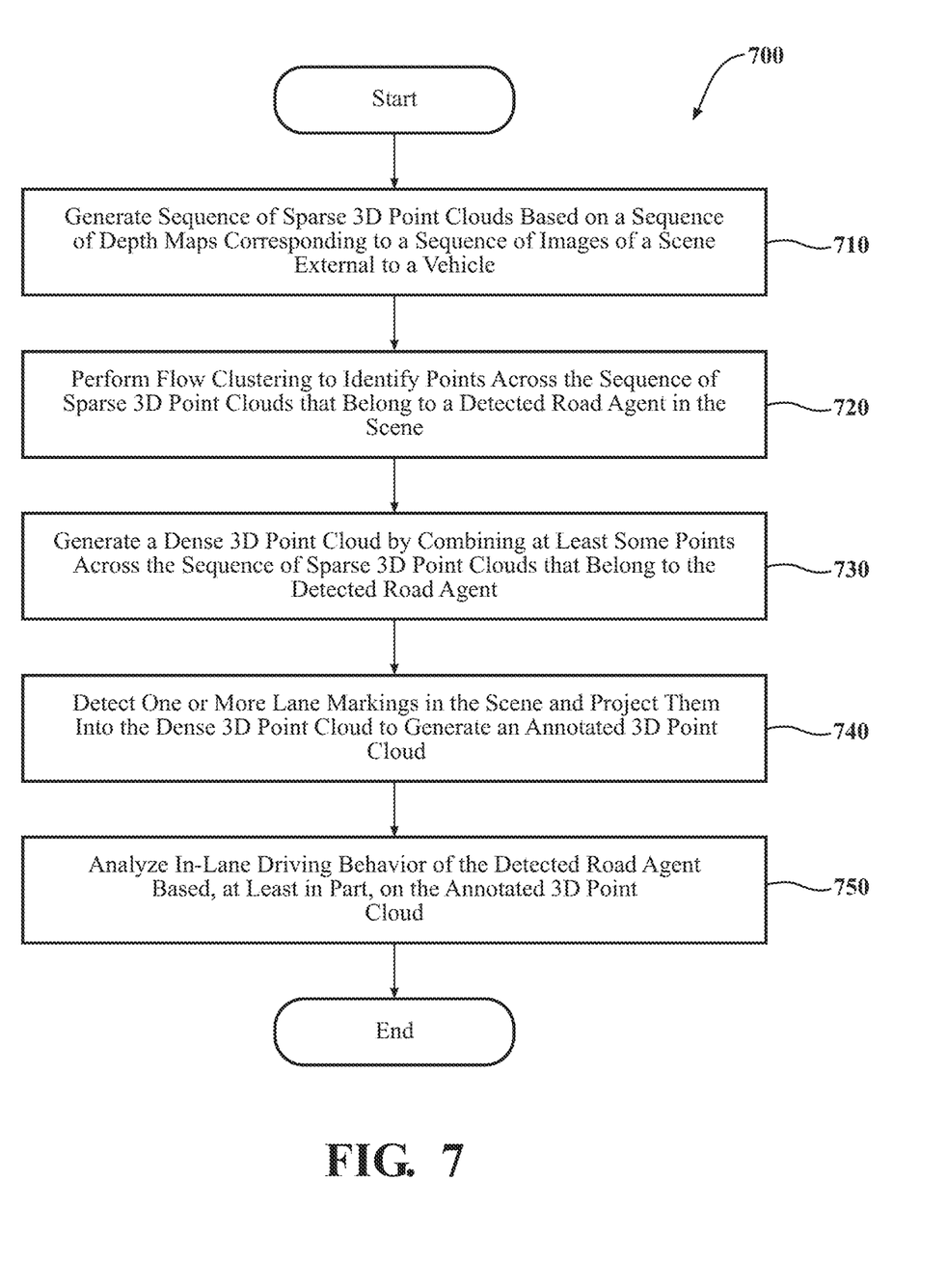
FIG. 7 is a flowchart of a method of analyzing the in-lane driving behavior of a road agent external to a vehicle, in accordance with an illustrative embodiment of the invention.

FIG. 7 is a flowchart of a method 700 of analyzing the in-lane driving behavior of a road agent (250) external to a vehicle 100, in accordance with an illustrative embodiment of the invention. Method 700 will be discussed from the perspective of the in-lane driving behavior analysis system 170 in FIG. 6. While method 700 is discussed in combination with in-lane driving behavior analysis system 170, it should be appreciated that method 700 is not limited to being implemented within in-lane driving behavior analysis system 170, but in-lane driving behavior analysis system 170 is instead one example of a system that may implement method 700.

At block 710, 3D rendering module 620 generates a sequence of sparse 3D point clouds 240 based on a sequence of depth maps 220 corresponding to a sequence of images 205 of a scene external to the vehicle 100. This is discussed above in connection with FIG. 2. For example, in some embodiments, each depth map 223 in the sequence of depth maps 220 is a grayscale image whose pixel intensities correspond to the distance from the camera 126 of the respective pixels in the corresponding image 208. As also mentioned above, the specific implementation of the MDE operation 210 discussed in connection with FIG. 2 can vary, depending on the particular embodiment. In one embodiment, a DNN is used to generate the sequence of depth maps 220.

At block 720, 3D rendering module 620 performs flow clustering (235) based on the sequence of depth maps 220 and the sequence of flow maps 230 corresponding to the sequence of images 205 to identify points across the sequence of sparse 3D point clouds 240 that belong to a detected road agent 250 in the scene. Flow clustering is discussed above in connection with FIG. 5. For example, in some embodiments, the flow maps 233 in the sequence of flow maps 230 are paired with the corresponding depth maps 223 in the sequence of depth maps 220 to generate a clustering mask 510 that identifies, along the temporal axis, the pixels that belong to the same detected road agent across the sequence of images 205. This information is used to identify the points across the sequence of sparse 3D point clouds 240 that belong to the detected road agent 250 in the scene.

At block 730, 3D rendering module 620 generates a dense 3D point cloud 245 that includes the detected road agent 250 by combining at least some of the points across the sequence of sparse 3D point clouds 240 that belong to the detected road agent 250. This dense 3D point cloud 245 includes a higher-resolution version of the detected road agent in 3D space to support an analysis of the detected road agent's in-lane driving behavior, as discussed above. As also discussed above, in some embodiments, 3D rendering module 620 includes instructions to pair the flow maps 233 in the sequence of flow maps 230 with corresponding depth maps 223 in the sequence of depth maps 220 to generate a clustering mask 510 that identifies the points across the sequence of sparse 3D point clouds 240 that belong to the detected road agent 250 in the scene. At least some of those points can then be superimposed (combined) to create the dense 3D point cloud 245.

At block 740, lane markings module 630 detects one or more lane markings 325 in the scene and projects the one or more lane markings 325 into the dense 3D point cloud 245 to generate an annotated 3D point cloud 340, as discussed above in connection with FIG. 3. As discussed above, in one embodiment, lane markings module 630 detects the lane markings 325 by processing the sequence of images 205 using another DNN (distinct from the two other distinct DNNs already mentioned in connection with the MDE operation 210 and the optical flow analysis). In such an embodiment, the DNN that detects lane markings 325 can be trained in a supervised fashion beforehand. As also discussed above, in other embodiments, other (non-machine-learning-based) algorithms (e.g., edge/line detection, filtering operations) can be used to detect lane markings 325 in the images 208 of sequence of images 205.

At block 750, analysis module 640 analyzes the in-lane driving behavior of the detected road agent 250 based, at least in part, on the annotated 3D point cloud 340. As discussed above, in some embodiments, analysis module 640 includes instructions to detect deviations (weaving, oscillating, meandering, drifting, etc.) of the trajectory of the detected road agent 250 from a reference (or expected) trajectory within the lane defined by the one or more lane markings (345) projected into the annotated 3D point cloud 340. In some embodiments, analysis module 640 includes instructions to determine that the detected deviations in the detected road agent's trajectory within the lane indicate anomalous (abnormal) driving behavior. In general, such a determination can be based on recognizing characteristic patterns in the trajectory that correspond to anomalous driving behavior. In some embodiments, this pattern analysis and recognition can be accomplished using machine-learning-based algorithms. In other embodiments, deterministic analysis algorithms (e.g., based on a figure of merit that measures cumulative deviation from the expected trajectory over a predetermined time horizon) can be applied to identify anomalous driving patterns in the detected road agent's trajectory. In some embodiments, analysis module 640 specifically identifies anomalous driving patterns associated with substance-impaired driving (e.g., drunk driving).

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-7, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an objectoriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for analyzing vehicular in-lane driving behavior, the system comprising:
one or more processors; and
a memory communicably coupled to the one or more processors and storing:
a three-dimensional (3D) rendering module including instructions that, when executed by the one or more processors, cause the one or more processors to:
generate a sequence of sparse 3D point clouds based on a sequence of depth maps corresponding to a sequence of images of a scene external to a vehicle;
perform flow clustering based on the sequence of depth maps and a sequence of flow maps corresponding to the sequence of images to identify points across the sequence of sparse 3D point clouds that belong to a detected road agent in the scene, wherein the sequence of flow maps is generated using a first deep neural network that includes a plurality of adjacent pairs of alternating convolution and deconvolution layers; and generate a dense 3D point cloud that includes the detected road agent by combining at least some of the points across the sequence of sparse 3D point clouds that belong to the detected road agent;

a lane markings module including instructions that, when executed by the one or more processors, cause the one or more processors to detect one or more lane markings in the scene and project the one or more lane markings into the dense 3D point cloud to generate an annotated 3D point cloud; and an analysis module including instructions that, when executed by the one or more processors, cause the one or more processors to analyze in-lane driving behavior of the detected road agent based, at least in part, on the annotated 3D point cloud.

2. The system of claim 1, further comprising:
a monocular depth estimation module including instructions that, when executed by the one or more processors, cause the one or more processors to process the sequence of images using a second deep neural network that performs monocular depth estimation to generate the sequence of depth maps;

wherein the instructions in the lane markings module to detect one or more lane markings in the scene include further instructions to process the sequence of images using a third deep neural network.

3. The system of claim 2, wherein the depth maps in the sequence of depth maps represent respective distances of image pixels from a camera as grayscale intensities and the flow maps in the sequence of flow maps represent a speed of the detected road agent as pixel intensities and a direction of movement of the detected road agent as pixel colors.

4. The system of claim 1, wherein the instructions in the 3D rendering module to perform the flow clustering include further instructions to pair the flow maps in the sequence of flow maps with corresponding depth maps in the sequence of depth maps to generate a clustering mask that identifies the points across the sequence of sparse 3D point clouds that belong to the detected road agent in the scene.

5. The system of claim 1, wherein the instructions in the analysis module to analyze the in-lane driving behavior of the detected road agent include further instructions to detect deviations of a trajectory of the detected road agent from a reference trajectory within a lane defined by the one or more lane markings projected into the annotated 3D point cloud.

6. The system of claim 1, wherein the detected road agent is one of another vehicle, a motorcycle, and a bicycle and the vehicle is one of an autonomous vehicle, a semi-autonomous vehicle, a vehicle equipped with an Advanced Driver-Assistance System, and a vehicle manually driven by a human driver.

7. A non-transitory computer-readable medium for analyzing vehicular in-lane driving behavior and storing instructions that, when executed by one or more processors, cause the one or more processors to:
generate a sequence of sparse three-dimensional (3D) point clouds based on a sequence of depth maps corresponding to a sequence of images of a scene external to a vehicle;
perform flow clustering based on the sequence of depth maps and a sequence of flow maps corresponding to the sequence of images to identify points across the sequence of sparse 3D point clouds that belong to a detected road agent in the scene, wherein the sequence of flow maps is generated using a first deep neural network that includes a plurality of adjacent pairs of alternating convolution and deconvolution layers;

generate a dense 3D point cloud that includes the detected road agent by combining at least some of the points across the sequence of sparse 3D point clouds that belong to the detected road agent;

detect one or more lane markings in the scene and project the one or more lane markings into the dense 3D point cloud to generate an annotated 3D point cloud; and analyze in-lane driving behavior of the detected road agent based, at least in part, on the annotated 3D point cloud.

8. The non-transitory computer-readable medium of claim 7, wherein the instructions include further instructions that, when executed by the one or more processors, cause the one or more processors to:
process the sequence of images using a second deep neural network that performs monocular depth estimation to generate the sequence of depth maps;

wherein the instructions to detect one or more lane markings in the scene include further instructions to process the sequence of images using a third deep neural network.

9. The non-transitory computer-readable medium of claim 7, wherein the instructions to perform the flow clustering include further instructions to pair the flow maps in the sequence of flow maps with corresponding depth maps in the sequence of depth maps to generate a clustering mask that identifies the points across the sequence of sparse 3D point clouds that belong to the detected road agent in the scene.

10. The non-transitory computer-readable medium of claim 7, wherein the instructions in the analysis module to analyze the in-lane driving behavior of the detected road agent include further instructions to detect deviations of a trajectory of the detected road agent from a reference trajectory within a lane defined by the one or more lane markings projected into the annotated 3D point cloud.

11. A method of analyzing vehicular in-lane driving behavior, the method comprising:
generating, by a processor, a sequence of sparse three-dimensional (3D) point clouds based on a sequence of depth maps corresponding to a sequence of images of a scene external to a vehicle;
performing flow clustering based on the sequence of depth maps and a sequence of flow maps corresponding to the sequence of images to identify points across the sequence of sparse 3D point clouds that belong to a detected road agent in the scene, wherein the sequence of flow maps is generated using a first deep neural network that includes a plurality of adjacent pairs of alternating convolution and deconvolution layers;
generating a dense 3D point cloud that includes the detected road agent by combining at least some of the points across the sequence of sparse 3D point clouds that belong to the detected road agent;
detecting one or more lane markings in the scene and projecting the one or more lane markings into the dense 3D point cloud to generate an annotated 3D point cloud; and
analyzing in-lane driving behavior of the detected road agent based, at least in part, on the annotated 3D point cloud.

12. The method of claim 11, further comprising:
processing the sequence of images using a second deep neural network that performs monocular depth estimation to generate the sequence of depth maps; and
processing the sequence of images using a third deep neural network to detect the one or more lane markings.

13. The method of claim 12, wherein the depth maps in the sequence of depth maps represent respective distances of image pixels from a camera as grayscale intensities and the flow maps in the sequence of flow maps represent a speed of the detected road agent as pixel intensities and a direction of movement of the detected road agent as pixel colors.

14. The method of claim 11, wherein performing the flow clustering includes pairing the flow maps in the sequence of flow maps with corresponding depth maps in the sequence of depth maps to generate a clustering mask that identifies the points across the sequence of sparse 3D point clouds that belong to the detected road agent in the scene.

15. The method of claim 11, wherein the analyzing in-lane driving behavior of the detected road agent includes detecting deviations of a trajectory of the detected road agent from a reference trajectory within a lane defined by the one or more lane markings projected into the annotated 3D point cloud.

16. The method of claim 11, wherein the detected road agent is one of another vehicle, a motorcycle, and a bicycle and the vehicle is one of an autonomous vehicle, a semi-autonomous vehicle, a vehicle equipped with an Advanced Driver-Assistance System, and a vehicle manually driven by a human driver.

* * * * *